United States Patent
Doyle et al.

[11] Patent Number: 5,127,715
[45] Date of Patent: Jul. 7, 1992

[54] TAPE CASE

[76] Inventors: Edwin T. Doyle, 207 Lantana, Orlando, Fla. 32807; Chris L. Bartunek, 1235 S. Bellaire #111, Denver, Colo. 80222

[21] Appl. No.: 654,208

[22] Filed: Feb. 11, 1991

[51] Int. Cl.⁵ .............................................. A47F 1/16
[52] U.S. Cl. ........................ 312/9.46; 312/247; 312/326; 211/115; 248/205.2; 248/206.5; 248/318
[58] Field of Search ............... 312/247, 284, 285, 310, 312/322, 326, 11, 305; 248/318, 320, 321, 322, 205.2, 206.5; 211/115

[56] References Cited

U.S. PATENT DOCUMENTS

| | | | |
|---|---|---|---|
| 855,201 | 5/1907 | Ramsey | 312/284 |
| 2,681,263 | 6/1954 | Angelillo | 312/310 |
| 3,201,072 | 8/1965 | DuBois | 248/206.5 |
| 4,293,075 | 10/1981 | Veralrud . | |
| 4,306,655 | 12/1981 | Smith . | |
| 4,420,196 | 12/1983 | Fuller . | |
| 4,518,084 | 5/1985 | Berkman . | |
| 4,629,066 | 12/1986 | Howard . | |

FOREIGN PATENT DOCUMENTS 0844472  9/1967  Canada .................................. 312/11

*Primary Examiner*—Gerald A. Anderson
*Attorney, Agent, or Firm*—Jerry T. Kearns

[57] ABSTRACT

A tape case has a hexagonal housing having a planar top surface provided with VELCRO and magnetic fasteners for attaching the housing to an interior ceiling of a motor vehicle. A rotary carousel is mounted on a piston rod for movement into and out of the stationary housing. A push button latching mechanism serves to retain the carousel in a retracted position within the housing. When a user wishes to replace or remove a tape from the storage carousel, the latching mechanism may be released by pushing a single button which lowers the storage carousel from the housing. The carousel is rotatably mounted by a piston rod which is slidably received with a hollow sleeve in the interior of the housing. Air vent apertures are formed in the hollow sleeve for lowering the carousel at a gradual rate of descent and for allowing the carousel to be rapidly moved to a retracted position.

12 Claims, 3 Drawing Sheets

TAPE CASE

BACKGROUND OF THE INVENTION

1. Field of the Invention

The present invention relates to tape cases, and more particularly pertains to a new and improved tape case specifically designed for attachment to an interior ceiling portion of a motor vehicle. Various types of tape storage cases are available for the organized storage of audio cassette tapes. Such tape cases are difficult to access by a driver or an occupant of a motor vehicle. In order to overcome this problem, the present invention provides a tape case which includes a stationary housing provided with VELCRO and magnetic fasteners for securement to the interior ceiling of a motor vehicle.

2. Description of the Prior Art

Various types of tape cases are known in the prior art. A typical example of such a tape case is to be found in U.S. Pat. No. 4,293,075, which issued to G. Veralrud on Oct. 6, 1981. This patent discloses a holder for receiving and supporting magnetic tape cassettes in the form of a generally rectangular housing provided with a plurality of dividers U.S. Pat. No. 4,306,655, which issued to R. Smith on Dec. 22, 1981, discloses a holder for tape cartridges which is in the form of a generally rectangular box provided with spaced shelves. Spaced ribs are provided on the shelves with a different spacing to hold additional items having a different width in transverse position in the box. In this manner, the box or holder has the capability of snugly and efficiently holding within it rectilinear articles of different widths and overall sizes, such as, for example, TV and computer game cartridges or video tape cartridges, and the like. U.S. Pat. No. 4,420,196, which issued to J. Fuller on Dec. 13, 1983, discloses a rotary filing device wherein mounting strips adapted to receive a container for an item or items to be stored are linked together in an endless chain and supported at each end in common recesses in a frame such that the chain is movable by tilting successive strips to provide access to each container in turn. U.S. Pat. No. 4,518,084, which issued to J. Berkman on May 21, 1985, discloses a case having a generally rectangular housing provided with a plurality of drawers. The drawers are provided with compartmentalized dividers for storing boxed or unboxed audio cassette tapes U.S. Pat. No. 4,629,066, which issued to W. Howard on Dec. 16, 1986, discloses a cassette carrying case having a generally rectangular briefcase configuration. A rectangular bottom of the case is formed with recesses for accommodating cassettes. A dome shaped top is hinged to the rectangular bottom and carries a domed styrene plastic insert that nests in the top and is formed with a number of parallel ribs that engage the tops of the cassettes when nested in the recesses in the bottom portion of the case.

While the above mentioned devices are suited for their intended usage, none of these devices provide a rotary cassette tape storage carousel for mounting to an interior ceiling portion of a vehicle. Additionally, none of the aforesaid devices disclose a rotary carousel mounted within a stationary housing by a piston rod mechanism for selective extension and retraction in a controlled and cushioned manner. Inasmuch as the art is relatively crowded with respect to these various types of tape cases, it can be appreciated that there is a continuing need for and interest in improvements to such tape cases, and in this respect, the present invention addresses this need and interest.

SUMMARY OF THE INVENTION

In view of the foregoing disadvantages inherent in the known types of tape cases now present in the prior art, the present invention provides an improved tape case. As such, the general purpose of the present invention, which will be described subsequently in greater detail, is to provide a new and improved tape case which has all the advantages of the prior art tape cases and none of the disadvantages.

To attain this, a representative embodiment of the concepts of the present invention is illustrated in the drawings and makes use of a hexagonal housing having a planar top surface provided with VELCRO and magnetic fasteners for attaching the housing to an interior ceiling of a motor vehicle. A rotary carousel is mounted on a piston rod for movement into and out of the stationary housing. A push button latching mechanism serves to retain the carousel in a retracted position within the housing. When a user wishes to replace or remove a tape from the storage carousel, the latching mechanism may be released by pushing a single button which lowers the storage carousel from the housing. The carousel is rotatably mounted by a piston rod which is slidably received within a hollow sleeve in the interior of the housing. Air vent apertures are formed in the hollow sleeve for lowering the carousel at a gradual rate of descent and for allowing the carousel to be rapidly moved to a retracted position.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tape case which has all the advantages of the prior art tape cases and none of the disadvantages.

It is another object of the present invention to provide a new and improved tape case which may be easily and efficiently manufactured and marketed.

It is a further object of the present invention to provide a new and improved tape case which is of a durable and reliable construction.

An even further object of the present invention is to provide a new and improved tape case which is susceptible of a low cost of manufacture with regard to both materials and labor, and which accordingly is then susceptible of low prices of sale to the consuming public, thereby making such tape cases economically available to the buying public.

Still yet another object of the present invention is to provide a new and improved tape case which provides in the apparatuses and methods of the prior art some of the advantages thereof, while simultaneously overcoming some of the disadvantages normally associated therewith.

Still another object of the present invention is to provide a new and improved tape case which provides convenient storage and access of audio tape cassettes in a motor vehicle.

Yet another object of the present invention is to provide a new and improved tape case which utilizes a stationary housing secured to an interior ceiling portion of a motor vehicle and having an axially extendable and retractable storage carousel mounted therein.

Even still another object of the present invention is to provide a new and improved tape case which provides a stationary housing having magnetic and VELCRO fasteners for securing the housing to an interior ceiling of a motor vehicle and which is provided with a rotary storage carousel which is mounted for axial extension and retraction at controlled rates by a piston cylinder mechanism.

Even still another object of the present invention is to provide a new and improved tape case which provides a rotary storage carousel mounted for axial extension and retraction within a stationary housing by a push button latch mechanism.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
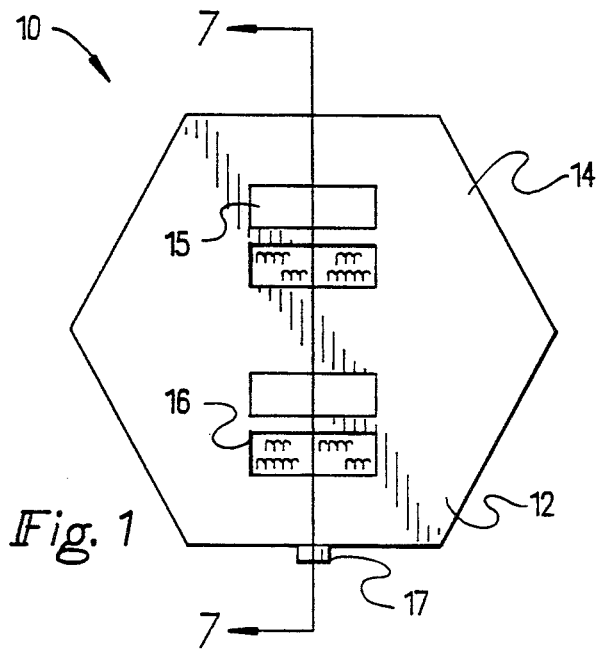
FIG. 1 a top view of the tape case of the present invention.

With reference now to the drawings, and in particular to FIG. 1 thereof, a new and improved tape case embodying the principles and concepts of the present invention and generally designated by the reference numeral 10 will be described.

More specifically, it will be noted that the first embodiment 10 of the invention includes generally hexagonal exterior housing 12 having a planar top surface 14. The housing 12 may be of any desired configuration such as octagonal, circular, square, etc. A pair of magnets 15 are mounted in rectangular recesses on the top surface 14 of the housing 12. A pair of VELCRO fastening strips 16 are also mounted on the top surface 14 of the housing 12. The magnets 15 serve to secure the housing 12 to interior ceilings of steel roofs of motor vehicles. Alternatively, cooperating VELCRO fastening strips may be adhesively secured on the interior ceiling portion of a motor vehicle for cooperative engagement with the fastening strips 16. Thus, the exterior housing 12 is adapted for securement in a stationary location on an interior ceiling portion of a motor vehicle.

Figure 2:
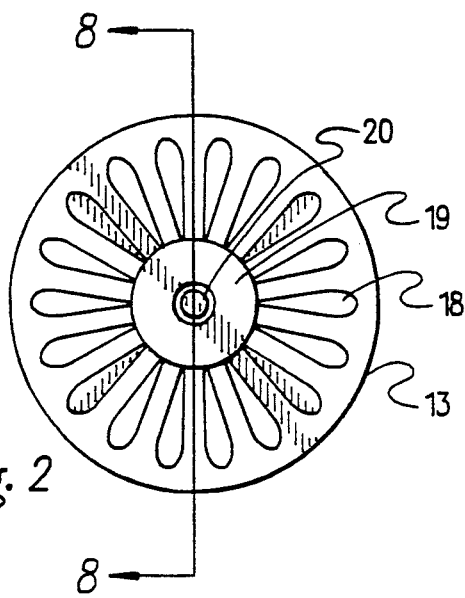
FIG. 2 is a top view of the rotary carousel of the tape case of the present invention, with the exterior housing removed.

In FIG. 2, a top view of a rotary storage carousel 13 is provided. The storage carousel 13 may be formed of any desired configuration such as hexagonal, octagonal, square, etc. The storage carousel 13 is mounted within the stationary housing 12 for axial extension and retraction in a manner to be subsequently described. The storage carousel 13 is provided with a plurality of circumferentially spaced dividers 18 which form recesses for the reception of audio tape cassettes. As is readily apparent to those of ordinary skill in the art, the design of the dividers 18 may be adjusted in dimension and spacing so as to provide storage for a large number of compact discs. The carousel 13 has a central cylindrical hub portion 19 which is provided with a plurality of longitudinal slots for the reception of edge portions of tape cassette storage boxes. The enlarged head 20 of a piston rod which extends from the hub 19 may be seen in FIG. 2.

Figure 3:
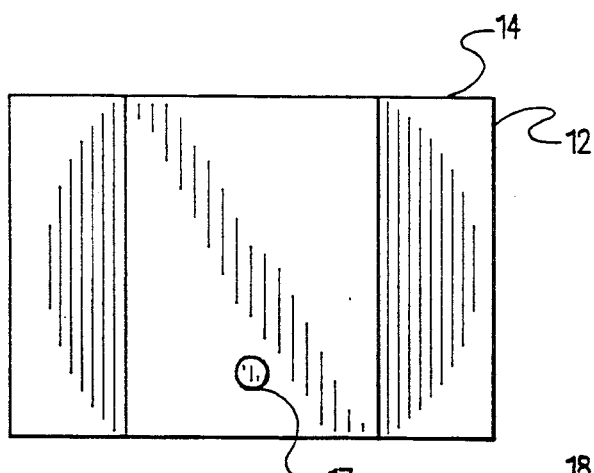
FIG. 3 is a side view of the tape case of FIG. 1.

In FIG. 3, a side view of the stationary housing 12 is provided. A push button 17 extends through a lower side portion of one of the faces of the housing 12 for purposes to be subsequently described.

Figure 4:
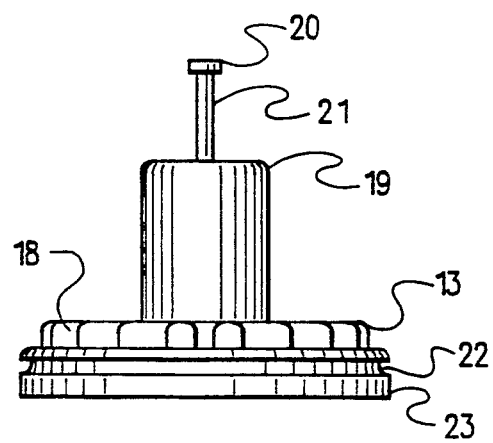
FIG. 4 a side view of the rotary storage carousel of FIG. 2.

In FIG. 4, a side view of the carousel 13 is provided. The piston rod 21 is secured to the cylindrical hub portion 19 and extends in fixed relation from a top surface thereof. The piston rod 21 has an enlarged head 20. The carousel 13 has a circular base 23 provided with a circumferential arcuate groove 22.

Figures 5, 6:
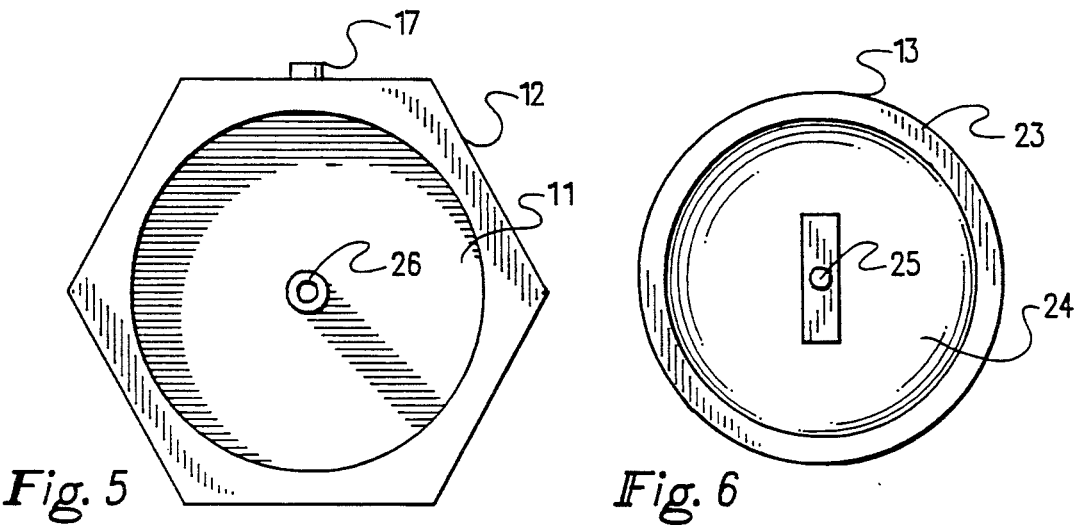
FIG. 5 is a bottom view of the exterior housing of the tape case of the present invention.
FIG. 6 is a bottom view of the rotary storage carousel of the tape case of the present invention.

In FIG. 5, a bottom view of the housing 12 is provided, with the rotary carousel 13 removed therefrom. A tubular sleeve 26 is mounted within the hollow interior 11 of the housing 12.

In FIG. 6, a bottom view of the carousel 13 is provided. A central recess 24 is formed in the bottom surface of the circular base 23. The enlarged bottom end 25 of the piston rod 21 is secured to the base 23.

Figure 7:
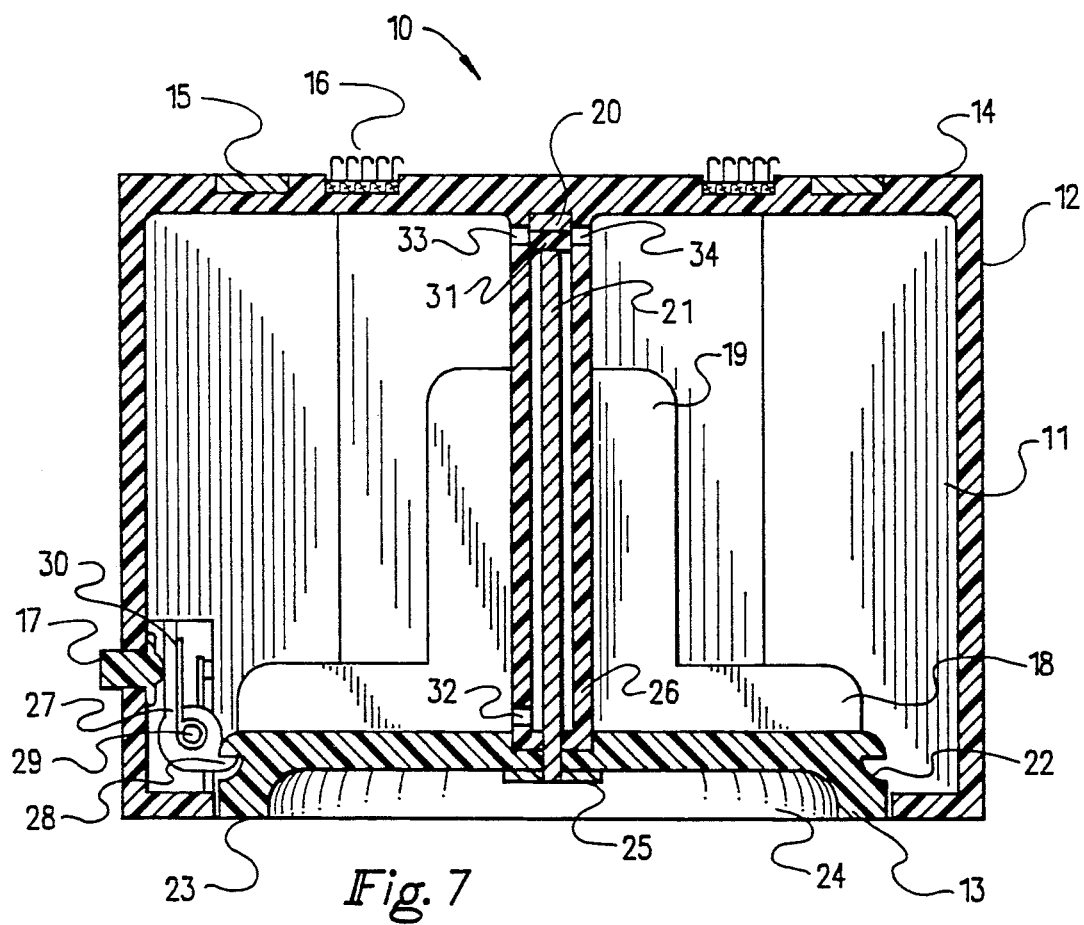
FIG. 7 is a cross sectional view, taken along line 7—7 of FIG. 1, illustrating the rotary storage carousel mounted in a retracted position within the exterior housing.

In FIG. 7, a cross sectional view of the tape case 10 of the present invention is provided, with the storage carousel 13 illustrated in a retracted position within the hollow interior 11 of the housing 12. The piston rod 21 secured to the carousel 13 is received within the hollow interior of the tubular sleeve 26. A rubber washer 31 is secured to the bottom surface of the enlarged head 20 of the piston rod 21. This securement may be achieved for example by adhesives. For assembly purposes, the sleeve 26 may be formed as a separate element from the housing 12 and secured in the illustrated position through the use of conventional fastening means after the insertion of the piston rod 21. This connection may be achieved by adhesives, or by a conventional threaded connection. The opposite end of the piston rod 21 is provided with an enlarged end portion 25 which is adhesively secured within the recessed portion 24 of the circular base 23 of the carousel 13. A latch mechanism mounted within the housing 12 includes a generally L-shaped pivotal latch 27 which is mounted for pivotal movement by a shaft 29. A leaf spring 30 received around the shaft 29 abuts the latch 30 and biases it to the illustrated latched position. The latch 27 in turn abuts the push button 17 which is retained by engagement of the enlarge end portion thereof with the interior side wall of the housing 12. A catch portion 28 of the latch 27 is in engagement in the arcuate undercut groove 22 formed in the circular base 23 of the carousel 13. Thus, the carousel 13 is locked in the illustrated axially retracted position. The hollow sleeve 26 is provided with an air bleed aperture 32 adjacent a lower portion thereof to allow air to escape from the interior of the sleeve 26 when the latch 30 is released. This allows the piston rod 21 to move downwardly within the sleeve 26. A pair of air bleed apertures 33 and 34 are provided adjacent a top end portion of the sleeve 26 to allow air to escape from the sleeve 26 when the piston rod 21 is being urged upwardly to an axially retracted position. By limiting the size of the air bleed aperture 32, the carousel 13 may be caused to descend at a gradual rate. Upon complete descent, the carousel 13 is cushioned to a stop by virtue of the rubber washer 31 coming into contact with the bottom of the sleeve 26. The rubber washer 31 also serves to provide an air seal around the enlarged head 20 of the piston rod 21. By providing a pair of air bleed apertures 33 and 34 at top portions of the sleeve 26, the carousel 13 may be moved rapidly to an axially retraction position because the air will be allowed to be expelled from the sleeve 26 at a greater rate. Thus, the carousel 13 will gradually move to an axially extended position, upon pressing of the push button 17 and may be rapidly moved to retracted position.

Figure 8:
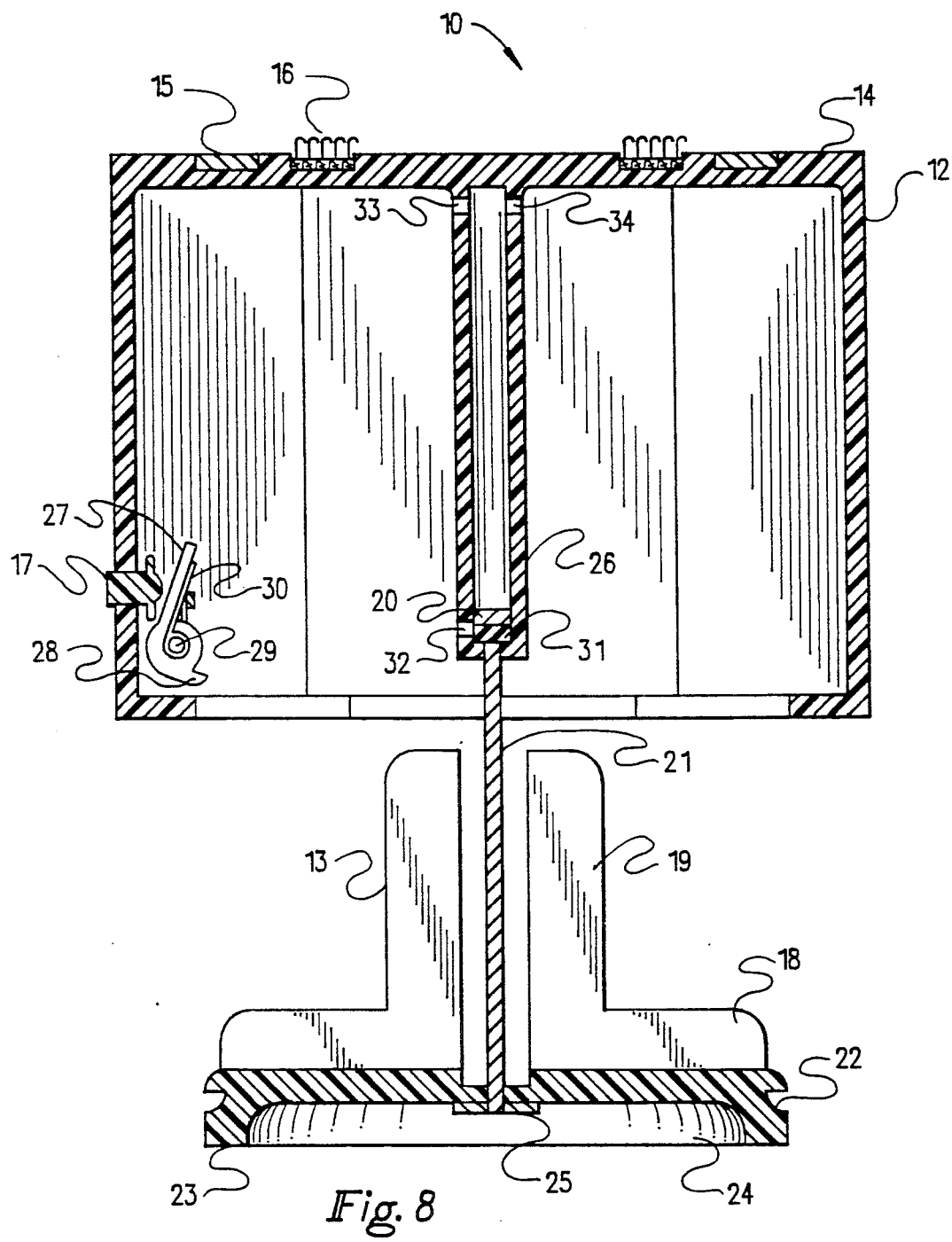
FIG. 8 is a cross sectional view, taken along line 8—8 of FIG. 2, illustrating the tape case of the present invention with the rotary carousel in an axially extended position.

In FIG. 8, a cross sectional view is provided which illustrates the tape case 10 of the present invention in an open or axially extended position. The push button 17 has been depressed, thus forcing the latch 27 to an unlatched position. This causes the latch portion 28 to move out of engagement with the groove 22 of the carousel 13, thus allowing the carousel 13 to move by the force of gravity to the illustrated axially extended position. In the illustrated position, the carousel 13 may be rotated about the axis of the piston rod 21, which causes the head 20 of the piston rod 21 to rotate within the sleeve 26. This allows convenient access to any cassette stored between the dividers 18 on the carousel 13.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification ar intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved tape case adapted for mounting on an interior ceiling portion of a motor vehicle, comprising:

a stationary hollow housing;

a rotary carousel;

means mounting said rotary carousel for axial extension and retraction within said housing;

means for securing said housing to the interior ceiling portion of a motor vehicle; and latch means for securing said carousel in an axially retracted position within said housing, said latch means including an L-shaped latch pivotally mounted within said housing, a push button extending through a side wall of said housing, spring means urging one leg portion of said latch into abutment with said push button, an arcuate undercut groove formed in said storage carousel, and a catch portion on said latch biased into engagement with said groove.

2. The tape case of claim 1, further comprising a plurality of dividers in a spaced circular array on said carrousel.

3. The tape case of claim 1, further comprising a hollow sleeve extending in an axial direction mounted in an interior portion of said housing; and a piston rod secured to said carousel and having an enlarged head portion received for sliding movement within said sleeve.

4. The tape case of claim 3, further comprising a first smaller diameter air bleed aperture formed within a lower end portion of said sleeve and a pair of second larger diameter air bleed apertures formed adjacent an upper portion of said sleeve for allowing said carousel to axially extend at a first reduced rate and be axially retracted at a second greater rate.

5. The tape case of claim 1, wherein said means for securing said housing to an interior ceiling portion of a motor vehicle comprises magnetic means.

6. The tape case of claim 1, wherein said means for securing said housing to an interior ceiling portion of a motor vehicle comprises VELCRO fastening means.

7. A new and improved tape case adapted for mounting on an interior ceiling portion of a motor vehicle, comprising:
- a stationary hollow housing;
- a rotary carousel;
- means mounting said rotary carousel for axial extension and retraction within said housing; and
- VELCRO fastening means for securing said housing to the interior ceiling portion of a motor vehicle.

8. The tape case of claim 7, further comprising a plurality of dividers in a spaced circular array on said carrousel.

9. The tape case of claim 7, further comprising a hollow sleeve extending in an axial direction mounted in an interior portion of said housing; and
- a piston rod secured to said carousel and having an enlarged head portion received for sliding movement within said sleeve.

10. The tape case of claim 9, further comprising a first smaller diameter air bleed aperture formed within a lower end portion of said sleeve and a pair of second larger diameter air bleed apertures formed adjacent an upper portion of said sleeve for allowing said carousel to axially extend at a first reduced rate and be axially retracted at a second greater rate.

11. The tape case of claim 7, further comprising latch means for securing said carousel in an axially retracted position within said housing.

12. The tape case of claim 11, wherein said latch means comprises:
- an L-shaped latch pivotally mounted within said housing;
- a push button extending through a side wall of said housing;
- spring means urging one leg portion of said latch into abutment with said push button;
- an arcuate undercut groove formed in said storage carousel; and
- a catch portion on said latch biased into engagement with said groove.

* * * * *